US012769298B2

(12) United States Patent
Roux et al.

(10) Patent No.: US 12,769,298 B2
(45) Date of Patent: Oct. 20, 2026

(54) METHOD, DEVICE, SYSTEM AND STORAGE MEDIUM FOR FAULT DIAGNOSIS AND SOLUTION RECOMMENDATION

(71) Applicant: Siemens Aktiengesellschaft, Munich (DE)

(72) Inventors: Armin Roux, Erlangen (DE); Bin Zhang, Beijing (CN); Zhong Yang Sun, Beijing (CN); Shun Jie Fan, Beijing (CN); Ming Jie, Beijing (CN)

(73) Assignee: SIEMENS AKTIENGESELLSCHAFT, Munich (DE)

(*) Notice: Subject to any disclaimer, the term of this patent is extended or adjusted under 35 U.S.C. 154(b) by 409 days.

(21) Appl. No.: 18/041,421

(22) PCT Filed: Aug. 14, 2020

(86) PCT No.: PCT/CN2020/109364
§ 371 (c)(1),
(2) Date: Feb. 13, 2023

(87) PCT Pub. No.: WO2022/032684
PCT Pub. Date: Feb. 17, 2022

(65) Prior Publication Data
US 2023/0324898 A1 Oct. 12, 2023

(51) Int. Cl.
*G05B 23/02* (2006.01)

(52) U.S. Cl.
CPC ..... *G05B 23/0275* (2013.01); *G05B 23/0272* (2013.01); *G05B 2219/24019* (2013.01)

(58) Field of Classification Search
None
See application file for complete search history.

(56) References Cited

U.S. PATENT DOCUMENTS 6,591,257 B1 * 7/2003 Martinka ................. G06N 5/04 706/46
8,983,952 B1 * 3/2015 Zhang ....................... G06F 7/00 707/736
(Continued)

FOREIGN PATENT DOCUMENTS

CA 2497709 A1 4/2000 ............. G01D 21/00
CN 101026501 A 8/2007 ............. H04L 12/24
(Continued)

OTHER PUBLICATIONS

Extended European Search Report, Application No. 20949182.8, 8 pages, Mar. 15, 2024.
(Continued)

*Primary Examiner* — Hua Lu
(74) *Attorney, Agent, or Firm* — Slayden Grubert Beard PLLC

(57) ABSTRACT

Examples of the present disclosure include methods and/or systems for fault diagnosis and solution recommendation. A method may include: obtaining original data including fault problem a target device; analyzing the original data of including fault obtain problem to problem description information; analyzing the problem description information to obtain a diagnosis report; and, according to the diagnosis report, obtaining a video and/or document solution for the fault based on a cloud knowledge map, and recommending the solution to a user. The knowledge map comprises: nodes representing the fault, video solution and/or document solution, and multiple edges representing the relationship between nodes.

9 Claims, 8 Drawing Sheets

(56) References Cited

U.S. PATENT DOCUMENTS

| | | | | |
|---|---|---|---|---|
| 10,990,089 | B2 * | 4/2021 | Takigawa | G05B 23/0281 |
| 11,513,480 | B2 * | 11/2022 | Chang | G05B 13/027 |
| 2007/0124265 | A1 * | 5/2007 | Hebbani | G06N 5/04 706/45 |
| 2009/0141642 | A1 * | 6/2009 | Sun | H04L 41/0677 370/252 |
| 2010/0082125 | A1 * | 4/2010 | Pingel | G05B 23/0272 700/47 |
| 2012/0100847 | A1 * | 4/2012 | Rahman | H04W 24/00 455/424 |
| 2014/0006861 | A1 * | 1/2014 | Jain | H04L 41/5074 714/E11.178 |
| 2014/0043983 | A1 * | 2/2014 | Huang | H04L 41/0677 370/244 |
| 2014/0310222 | A1 * | 10/2014 | Davlos | G06F 11/2294 706/46 |
| 2015/0276433 | A1 * | 10/2015 | Brahmajosyula | G06Q 10/10 340/870.02 |
| 2018/0131907 | A1 * | 5/2018 | Schmirler | G05B 23/0216 |
| 2019/0170396 | A1 * | 6/2019 | Azulay | F24H 15/128 |
| 2019/0204820 | A1 * | 7/2019 | Andrassy | G05B 23/0272 |
| 2019/0310620 | A1 * | 10/2019 | Kamiguti | G06F 11/0766 |
| 2020/0209109 | A1 * | 7/2020 | Liang | G01M 13/00 |
| 2020/0310380 | A1 | 10/2020 | Sun | G05B 19/406 |
| 2021/0048487 | A1 * | 2/2021 | He | G06N 3/0464 |

FOREIGN PATENT DOCUMENTS

| | | | | |
|---|---|---|---|---|
| CN | 101833324 | A | 9/2010 | G05B 19/418 |
| CN | 102 571 987 | | 7/2012 | B29B 17/04 |
| CN | 102 183 945 | | 9/2014 | G05B 23/02 |
| CN | 104796770 | A | 7/2015 | H04N 21/24 |
| CN | 105 391 579 | | 3/2016 | H04L 12/24 |
| CN | 105389745 | A | 3/2016 | G06Q 50/06 |
| CN | 105631596 | A | 6/2016 | G06Q 10/06 |
| CN | 106 254 139 | | 12/2016 | H04L 12/24 |
| CN | 106298582 | A | 1/2017 | H01L 21/67 |
| CN | 108416294 | A | 8/2018 | G06K 9/00 |
| CN | 108615057 | A | 10/2018 | G06K 9/62 |
| CN | 108846418 | A | 11/2018 | G01J 5/00 |
| CN | 109102730 | A | 12/2018 | G06Q 50/20 |
| CN | 109358603 | A | 2/2019 | G05B 23/02 |
| CN | 110414547 | A | 11/2019 | G06K 9/62 |
| CN | 110850832 | A | 2/2020 | G05B 19/418 |
| CN | 110954326 | A | 4/2020 | G01M 13/045 |
| CN | 110968619 | A | 4/2020 | G06F 16/2458 |
| CN | 111241482 | A | 6/2020 | G06F 17/18 |
| WO | 2019 061481 | | 4/2019 | G05B 23/00 |

OTHER PUBLICATIONS

Search Report for International Application No. PCT/CN2020/109364, 12 pages, Apr. 25, 2021.

Chinese Office Action, Application No. 202080103939.4, 14 pages, May 29, 2025.

Chinese Office Action, Application No. 202080103939.4, 17 pages, Aug. 8, 2025.

Qiu, Guanshang, "Basic Number Flow Analysis of Automobile Electric Control Engine Failure Diagnosis Analysis," Automation and Instrumentation, 2017, No. 8, 6 pages (Chinese w/ English translation), Aug. 25, 2017.

Chinese Office Action, Application No. 202080103939.4, 6 pages, Nov. 19, 2025.

* cited by examiner

METHOD, DEVICE, SYSTEM AND STORAGE MEDIUM FOR FAULT DIAGNOSIS AND SOLUTION RECOMMENDATION

CROSS-REFERENCE TO RELATED APPLICATIONS

This application is a U.S. National Stage Application of International Application No. PCT/CN2020/109364 filed Aug. 14, 2020, which designates United States of America, the contents of which are hereby incorporated by reference in their entirety.

TECHNICAL FIELD

The present disclosure relates to computer technologies. Various embodiments of the teachings here include methods, devices, systems, and/or computer readable storage media for fault diagnosis and solution recommendation.

BACKGROUND

Digital technology refers to a technology with which computers and networks are used. Digital technology has been applied to a variety of industries and fields, such as traditional manufacturing plants. Digital factory refers to digital and information services for traditional manufacturing plants by using computer hardware and software technology. Digital factory integrates various systems and databases of factory, product and control, and improves the flexibility and efficiency of factory manufacturing process by means of visualization, simulation and big data.

In modern digital factories, it is difficult for workers to solve unexpected problems in time. Therefore, an intelligent diagnosis and solution recommendation system for factory conditions is necessary.

SUMMARY

Some examples of the teachings of the present disclosure include methods, devices, systems, and/or computer readable storage media for fault diagnosis and solution recommendation is provided to achieve the intelligent fault diagnosis and solution recommendation and improves the flexibility and efficiency of fault diagnosis and solution recommendation. For example, some embodiments include a method for fault diagnosis and solution recommendation comprising: obtaining original data including fault problem of a target device; analyzing the original data including fault problem to obtain problem description information; analyzing the problem description information to obtain a diagnosis report; according to the diagnosis report, obtaining a video and/or document solution for the fault based on a cloud knowledge map, and recommending the solution to a user; the knowledge map comprises: nodes representing the fault, video solution and/or document solution, and multiple edges representing the relationship between nodes.

In some embodiments, original data including fault problem comprises: data stream with device identification and time information; wherein analyzing the original data including fault problem to obtain problem description information comprises: obtaining a task document from a cloud task management database according to the device identification and time information; the cloud task management database stores task documents comprising the standard processes and steps of each task of each device; dividing the data stream into corresponding data segments according to the standard processes and steps in the task document; determining a target step with a fault by locating an error signal in a data segment; comparing the part corresponding to the target step in the task document with that in the data stream, analyzing a fault reason based on the comparison, and generating the problem description information.

In some embodiments, obtaining original data including fault problem of a target device comprises: collecting data stream with device identification and time information at a set frequency; in response to receiving a fault report from a user, extracted corresponding data stream of the target device from the obtained data stream according to the device identification and time information provided by the fault report.

In some embodiments, analyzing the problem description information to obtain a diagnosis report comprises inputting the problem description information into a pre trained fault diagnosis model based on convolutional neural network, and obtaining a diagnosis report output by the fault diagnosis model; the fault diagnosis model is trained by taking a large number of historical problem description information as the input samples, and taking the historical diagnosis report corresponding to each piece of historical problem description information as the output samples.

In some embodiments, original data including fault problem comprises: fault multimedia content, and the fault multimedia content comprises: a video containing fault process or a photo containing fault area; wherein analyzing the original data including fault problem to obtain problem description information comprises: inputting the fault multimedia content into a fault analysis model trained in advance based on convolutional neural network, and obtaining the problem description information output by the fault analysis model; the fault analysis model is trained by taking a large number of historical fault multimedia content as input samples, and taking corresponding historical problem description information of fault multimedia content output as samples; wherein the historical fault multimedia content and corresponding historical problem description information are stored in a cloud image database.

In some embodiments, the fault analysis model comprises a multimedia content classification model and multiple fault analysis sub models; the multimedia content classification model is to classify the multimedia content, and input the multimedia content to a corresponding fault analysis sub model according to a classification result; each fault analysis sub model is to output corresponding problem description information according to the input multimedia content.

In some embodiments, the method further comprises: feeding back the problem description information to the user for checking, and receiving problem description information confirmed by the user; taking the problem description information confirmed by the user as finally determined problem description information; storing the finally determined problem description information and the fault multimedia content in the cloud image database as a new historical sample to optimize the fault analysis model.

As another example, some embodiments include a device for fault diagnosis and recommendation a solution comprising: data obtaining module, to obtain original data including fault problem of a target device; a fault analysis module, to analyze the original data including fault problem to obtain problem description information; a fault diagnosis module, to analyze the problem description information to obtain a diagnosis report; and a solution recommendation module, to obtain obtaining a video and/or document solution for the fault based on a cloud knowledge map according to the diagnosis report, and to recommend the video and/or document solution to a user.

In some embodiments, the original data comprises data stream with a device identification and time information, and/or fault multimedia content; the fault multimedia content comprises: a video containing fault process or a photo containing fault area.

In some embodiments, the fault analysis module comprises a data stream analysis module and/or a multimedia content analysis module; the data stream analysis module, to: obtain a task document from a cloud task management database according to the device identification and time information; the cloud task management database stores task documents comprising the standard processes and steps of each task of each device; divide the data stream into corresponding data segments according to the standard processes and steps in the task document; determine a target step with a fault by locating an error signal in a data segment; and compare the part corresponding to the target step in the task document with that in the data stream, analyze a fault reason based on the comparison, and generate the problem description information; the multimedia content analysis module, to: input the fault multimedia content into a fault analysis model trained in advance based on convolutional neural network, and obtain the problem description information output by the fault analysis model; the fault analysis model is trained by taking a large number of historical fault multimedia content as input samples, and taking corresponding historical problem description information of fault multimedia content as output samples; wherein the historical fault multimedia content and corresponding historical problem description information are stored in an cloud image database.

Some embodiments include a device for fault diagnosis and solution recommendation comprising: at least one memory, to store a computer program; and at least one processor, to call the computer program stored in the at least one memory to perform a method for fault diagnosis and solution recommendation as described herein.

As another example, some embodiments include a system for fault diagnosis and solution recommendation comprising: a device for fault diagnosis and solution recommendation as described herein; a cloud task management database, to store task documents including the standard processes and steps of each task of each device; a cloud image database, to store historical fault multimedia content and corresponding historical problem description information of fault multimedia content; and an cloud instructional resources knowledge map, to comprises nodes representing a fault, a video solution and/or document solution, and multiple edges representing the relationship between nodes.

As another example, some embodiments include a non-transitory computer-readable storage medium, on which a computer program is stored, characterized in that, the computer program is to be executed by a processor to implement one or more of the methods for fault diagnosis and solution recommendation as described herein.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures. In the figures.

Figure 1:
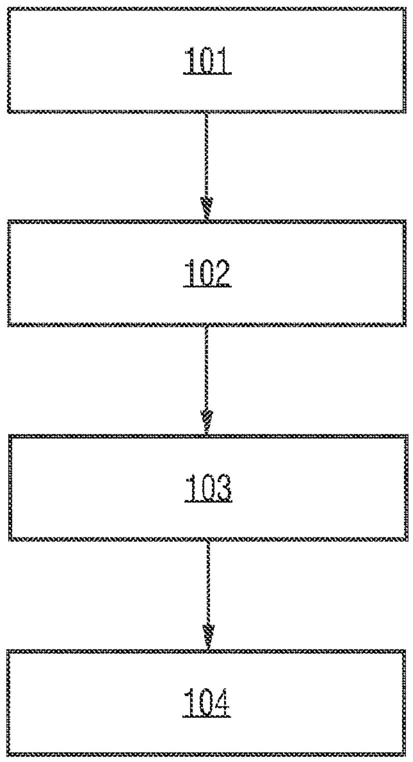
FIG. 1 is a flow diagram illustrating a method for fault diagnosis and solution recommendation incorporating teachings of the present disclosure.

The reference numerals are as follows:

| Reference numeral | Object |
|---|---|
| 101~104, 301~313, 401~404, 501~512, 601~602, 701~711 | processes |
| 1 | database layer |
| 11 | task management database |
| 12 | image database |
| 13 | instructional resources knowledge map |
| 2 | analysis layer |
| 21 | data stream analysis package |
| 22 | multimedia content analysis package |
| 23 | diagnosis package |
| 24 | recommendation engine |
| 31 | motor |
| 32 | PLC |
| 33 | CNC |
| 81 | data obtaining module |
| 82 | fault analysis module |
| 821 | data stream analysis module |
| 822 | multimedia content analysis module |
| 83 | fault diagnosis module |
| 84 | solution recommendation module |
| 91 | memory |
| 92 | processor |

DETAILED DESCRIPTION

Various methods for fault diagnosis and solution recommendation incorporating teachings of the present disclosure include: obtaining original data including fault problem of a target device; analyzing the original data including fault problem to obtain problem description information; analyzing the problem description information to obtain a diagnosis report; according to the diagnosis report, obtaining a video and/or document solution for the fault based on a cloud knowledge map, and recommending the solution to a user; the knowledge map comprises: nodes representing the fault, video solution and/or document solution, and multiple edges representing the relationship between nodes.

In some embodiments, original data including fault problem includes: data stream with device identification and time information; analyzing the original data including fault problem to obtain problem description information includes: obtaining a task document from a cloud task management database according to the device identification and time information; the cloud task management database stores task documents comprising the standard processes and steps of each task of each device; dividing the data stream into corresponding data segments according to the standard processes and steps in the task document; determining a target step with a fault by locating an error signal in a data segment; comparing the part corresponding to the target step in the task document with that in the data stream, analyzing a fault reason based on the comparison, and generating the problem description information.

In some embodiments, obtaining original data including fault problem of a target device includes: collecting data stream with device identification and time information at a set frequency; in response to receiving a fault report from a user, extracted corresponding data stream of the target device from the obtained data stream according to the device identification and time information provided by the fault report.

In some embodiments, analyzing the problem description information to obtain a diagnosis report includes: inputting the problem description information into a pre trained fault diagnosis model based on convolutional neural network, and obtaining a diagnosis report output by the fault diagnosis model; the fault diagnosis model is trained by taking a large number of historical problem description information as the input samples, and taking the historical diagnosis report corresponding to each piece of historical problem description information as the output samples.

In some embodiments, original data including fault problem includes: fault multimedia content, and the fault multimedia content includes: a video containing fault process or a photo containing fault area; wherein analyzing the original data including fault problem to obtain problem description information includes: inputting the fault multimedia content into a fault analysis model trained in advance based on convolutional neural network, and obtaining the problem description information output by the fault analysis model; the fault analysis model is trained by taking a large number of historical fault multimedia content as input samples, and taking corresponding historical problem description information of fault multimedia content as output samples; wherein the historical fault multimedia content and corresponding historical problem description information are stored in a cloud image database.

In some embodiments, the fault analysis model includes a multimedia content classification model and multiple fault analysis sub models; the multimedia content classification model is to classify the multimedia content, and input the multimedia content to a corresponding fault analysis sub model according to a classification result; each fault analysis sub model is to output corresponding problem description information according to the input multimedia content.

In some embodiments, the method further includes: feeding back the problem description information to the user for checking, and receiving problem description information confirmed by the user; taking the problem description information confirmed by the user as correct problem description information; storing the finally determined problem description information and the fault multimedia content in the cloud image database as s a new historical sample to optimize the fault analysis model.

An example device for fault diagnosis and solution recommendation incorporating teachings of the present disclosure includes: a data obtaining module, to obtain original data including fault problem of a target device; a fault analysis module, to analyze the original data including fault problem to obtain problem description information; a fault diagnosis module, to analyze the problem description information to obtain a diagnosis report; and a solution recommendation module, to obtain obtaining a video and/or document solution for the fault based on a cloud knowledge map according to the diagnosis report, and to recommend the video and/or document solution to a user.

In some embodiments, the original data includes data stream with a device identification and time information, and/or fault multimedia content; the fault multimedia content includes: a video containing fault process or a photo containing fault area.

In some embodiments, the fault analysis module includes a data stream analysis module and/or a multimedia content analysis module; the data stream analysis module, to: obtain a task document from a cloud task management database according to the device identification and time information; the cloud task management database stores task documents comprising the standard processes and steps of each task of each device; divide the data stream into corresponding data segments according to the standard processes and steps in the task document; determine a target step with a fault by locating an error signal in a data segment; and compare the part corresponding to the target step in the task document with that in the data stream, analyze a fault reason based on the comparison, and generate the problem description information; the multimedia content analysis module, to: input the fault multimedia content into a fault analysis model trained in advance based on convolutional neural network, and obtain the problem description information output by the fault analysis model; the fault analysis model is trained by taking a large number of historical fault multimedia content as input samples, and taking corresponding historical problem description information of fault multimedia content as output samples; wherein the historical fault multimedia content and corresponding historical problem description information are stored in a cloud image database.

Some embodiments include a device for fault diagnosis and solution recommendation incorporating teachings of the present disclosure includes: at least one memory, to store a computer program; and at least one processor, to call the computer program stored in the at least one memory to perform one or more of the methods for fault diagnosis and solution recommendation described herein.

As another example, some embodiments include a system for fault diagnosis and solution recommendation provided by examples of the present disclosure comprising: a device for fault diagnosis and solution recommendation as described herein; a cloud task management database, to store task documents including the standard processes and steps of each task of each device; a cloud image database, to store historical fault multimedia content and corresponding historical problem description information of fault multimedia content; and a cloud instructional resources knowledge map, to comprises nodes representing a fault, a video solution and/or document solution, and multiple edges representing the relationship between nodes.

As another example, some embodiments include a non-transitory computer-readable storage medium, on which a computer program is stored, the computer program is to be executed by a processor to implement one or more methods for fault diagnosis and solution recommendation as described herein.

In the present disclosure, because all of the fault analysis, fault diagnosis and solution recommendation are performed by the third party, the user only needs to do some simple operations without analyzing the fault reason, thus the intelligent fault diagnosis and solution recommendation is achieved, and the flexibility and efficiency of fault diagnosis and solution recommendation is improved.

In the present disclosure, it is considered that in the digital factories, some devices such as most CNC machines have their own diagnostic programs, but t most of them performs judgment according to the established mode, and cannot perform diagnosis according to the characteristics of specific tasks. In addition, diagnostic programs of some control system also recommend some solutions, but most of these solutions are usually limited to the documents stored in advance. In addition, most of the diagnostic programs are based on the data collected by the device itself, and it is difficult to diagnose the faults that need to be detected by sensors. Therefore, an intelligent fault diagnosis and solution recommendation scheme is provided in the embodiments of the disclosure.

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

FIG. 1 is a flow diagram illustrating a method for fault diagnosis and solution recommendation incorporating teachings of the present disclosure. As shown in FIG. 1, the method may include the following processes:

At block 101, original data including fault problem of a target device is obtained. The original data may be obtained by a data collection module of a robot, such as a knowledge transfer robot. In some embodiments, the original data may include the data stream including an error signal, device identification (such as machine number) and time information (such as timestamp) reported or uploaded by a device based on OPC UA. The data stream here can include the data collected by the device itself and the data collected by the sensor.

In some embodiments, the data stream, device identification and time information may be obtained at a set frequency. In response to receiving a fault report from a user, the corresponding data stream of the target device may be extracted from the obtained data stream according to the device identification and time information provided by the fault report. For example, when a fault occurs, the user may call the cloud robot, and report the device identification of the target device on which the fault occurs and time information when the fault occurs to the robot.

In some embodiments, the original data may include fault multimedia content. The fault multimedia content may include: a video containing fault process or a photo containing fault area. For example, when a fault occurs, the user may take a video or a photo, and send the video or the photo to the robot.

At block 102, the original data including fault problem is analyzed, and problem description information is obtained. In some embodiments, the original data including fault problem may be analyzed by a fault analysis package of the robot. When the original data includes data with the stream device identification and time information, the fault analysis package may include a data stream analysis package, and the data stream analysis package may find a corresponding task document from a task management database according to the device identification and time information of the target device. The task management database stores task documents including the standard processes and steps of each task of each device. According to the standard processes and steps in the task document, the data stream analysis package divides the data stream collected from the target device into corresponding data segments, and to determine a target step with a fault by locating an error signal in a data segment. The data stream analysis package compares the part corresponding to the target step in the task document with that in the data stream and analyzes the fault reason based on the comparison, and generates the problem description information.

In some embodiments, the task management database may be a cloud task management database. With the cloud task management database, the task documents stored in the cloud task management database may be shared by different factories. When the original data includes the multimedia content, the fault analysis package may include a multimedia content analysis package, and the multimedia content analysis package may input the fault multimedia content into a fault analysis model trained in advance based on convolutional neural network, and obtain the problem description information output by the fault analysis model. The fault analysis model is trained by taking a large number of historical fault multimedia content as input samples, and taking corresponding historical problem description information of fault multimedia content as output samples. The historical fault multimedia content and the corresponding historical problem description information of fault multimedia content may be stored in an image database.

In some embodiments, the fault analysis model may include a multimedia content classification model and a number of fault analysis sub models. The multimedia content classification model is configured to classify the multimedia content, and input the multimedia content to a corresponding fault analysis sub model according to a classification result. Each fault analysis sub model is configured to output the corresponding problem description information according to the input multimedia content.

In some embodiments, the multimedia content analysis package feeds back the problem description information to the user for checking, and receives problem description information confirmed by the user. When the problem description information fed back by the multimedia content analysis package meets the actual problem, the user will directly confirm it, and the problem description information confirmed by the user is the same as that fed back by the multimedia content analysis package; when the problem description information fed back by the multimedia content analysis package does not meet the actual problem, the user will manually write a new piece of problem description information or amend the fed back problem description information, and the problem description information confirmed by the user is that newly written or amended by the user.

Then, the problem description information confirmed by the user is taken as the finally determined problem description information, namely the correct problem description information. The correct problem description information and the fault multimedia content may be taken as a new historical sample to optimize the fault analysis model. When there is the image database, the correct problem description information and the fault multimedia content may be stored in the image database as a new record item, and then the fault analysis model may be optimized based on the updated image database.

In some embodiments, the image database may be a cloud image database. With the cloud image database, the fault analysis model can be fully trained and updated in time due to the amount of fault multimedia content and problem description information in the cloud image database is huge, thus the accuracy of the fault analysis model will be very high.

In the present disclosure, the problem description information may include a fault type and corresponding fault description. At block 103, the problem description information is analyzed, and a diagnosis report is obtained.

In some embodiments, the problem description information may be analyzed by a diagnosis package of the robot, and the diagnosis package may input the problem description information into a pre trained fault diagnosis model based on convolutional neural network, and obtain a diagnosis report output by the fault diagnosis model. The fault diagnosis model is trained by taking a large number of historical problem description information as the input samples, and taking the historical diagnosis report corresponding to each piece of historical problem description information as the output samples. In an example, the historical problem description information and corresponding historical diagnosis report may be stored in a diagnosis management database.

In some embodiments, the diagnosis management database may be a cloud diagnosis management database. With the cloud diagnosis management database, the fault diagnosis model can be fully trained and updated in time due to the amount of diagnosis and diagnosis report in the cloud diagnosis management database is huge, thus the accuracy of the fault diagnosis model will be very high.

At block 104, according to the diagnosis report, a video solution and/or document solution for the fault is obtained based on a knowledge map, and the solution is recommended to the user. The knowledge map may include: nodes representing the fault, video solution and/or document solution, and multiple edges representing the relationship between nodes. In some embodiments, the video solution and/or document solution for the fault may be obtained by a recommendation engine of the robot.

The knowledge map may be an instructional resources knowledge map, and the knowledge map may be a cloud knowledge map. With the cloud knowledge map, the instructional resources can be shared by different factories, and because the instructional resources are abundant, the user can get timely and efficient guidance.

Figure 2:
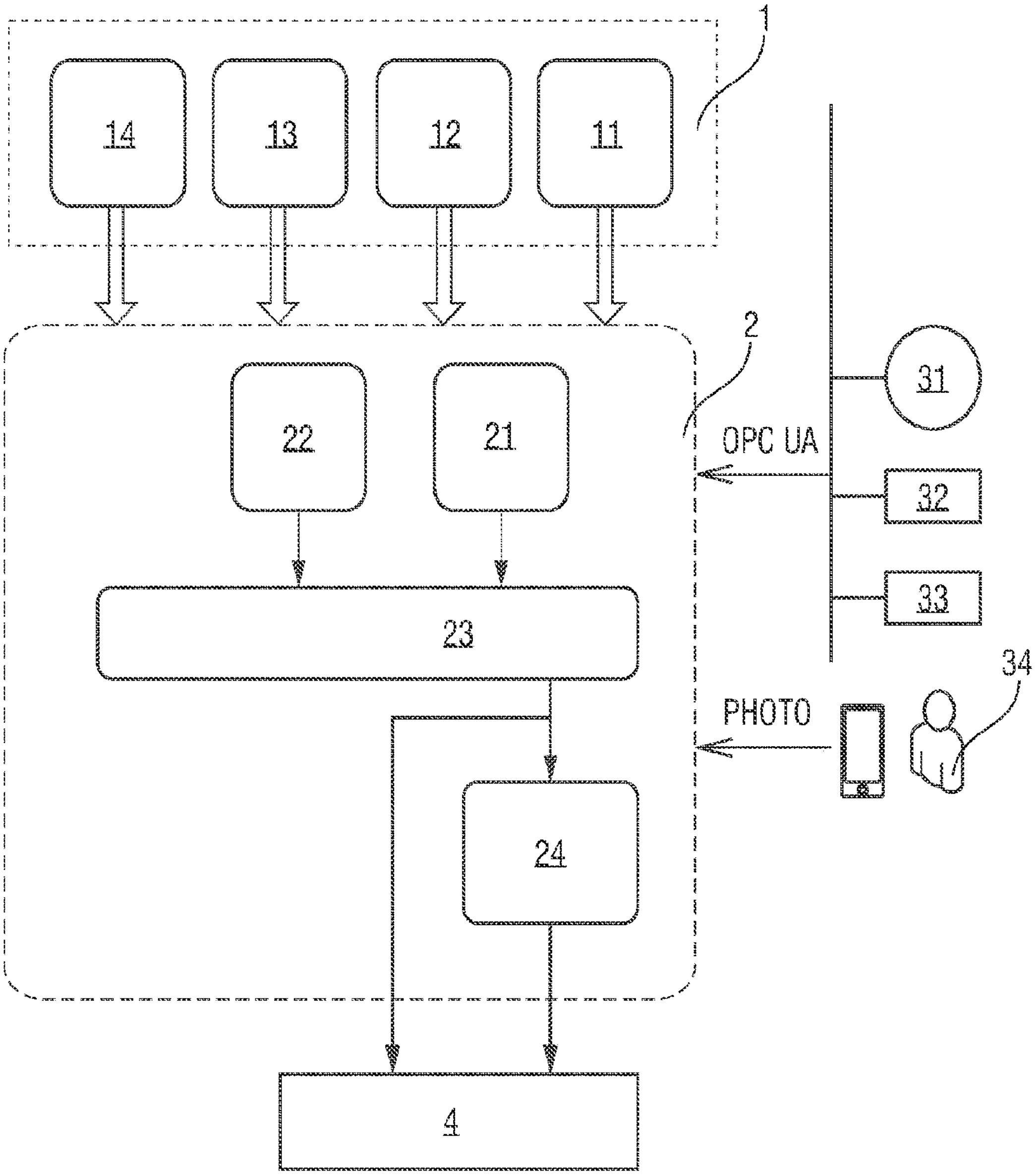
FIG. 2 is a schematic diagram illustrating an application scenario incorporating teachings of the present disclosure.

An example will be taken to illustrate above mentioned scheme hereinafter. FIG. 2 is a schematic diagram illustrating an application scenario incorporating teachings of the present disclosure. As shown in FIG. 2, in the application scenario, there are a database layer 1 and an analysis layer 2.

In the database layer 1, there are a task management database 11, an image database 12, an instructional resources knowledge map 13 and a diagnosis management database 14. The databases 11, 12, 13 and 14 may be cloud database or local database.

The task management database 11 stores task documents including the standard processes and steps of each task of each device. The image database 12 stores a large number of historical fault multimedia content and the corresponding historical problem description information fault of multimedia content. The instructional resources map knowledge 13 includes nodes representing the fault, video solution and/or document solution, and multiple edges representing the relationship between nodes. The diagnosis management database 14 stores a large number of historical problem description information and corresponding historical diagnosis report.

In the analysis layer 2, there are a data stream analysis package 21, a multimedia content analysis package 22, a diagnosis package 23 and a recommendation engine 24. The data stream analysis package 21 and the multimedia content analysis package 22 may be included in an analysis module of a robot, the diagnosis package 23 may be a diagnosis module of the robot, and the recommendation engine 24 may be a recommendation module of the robot.

Data stream with device identification and time information of a machine, such as a motor 31, a PLC 32 and a CNC 33 may be transmitted to a data collection module of the robot, and corresponding data stream is provided to the data stream analysis package 21 based on OPC UA protocol. Photo or video taken by a user 34 may be sent to the data collection module and then provide to the multimedia content analysis package 22.

A diagnosis report out by the diagnosis package 23 and the solution recommended by the recommendation engine 24 may be displayed on a screen 4, such as the screen of the robot. In some embodiments, the robot may be replaced by other devices for diagnosis and solution recommendation.

Figure 3:
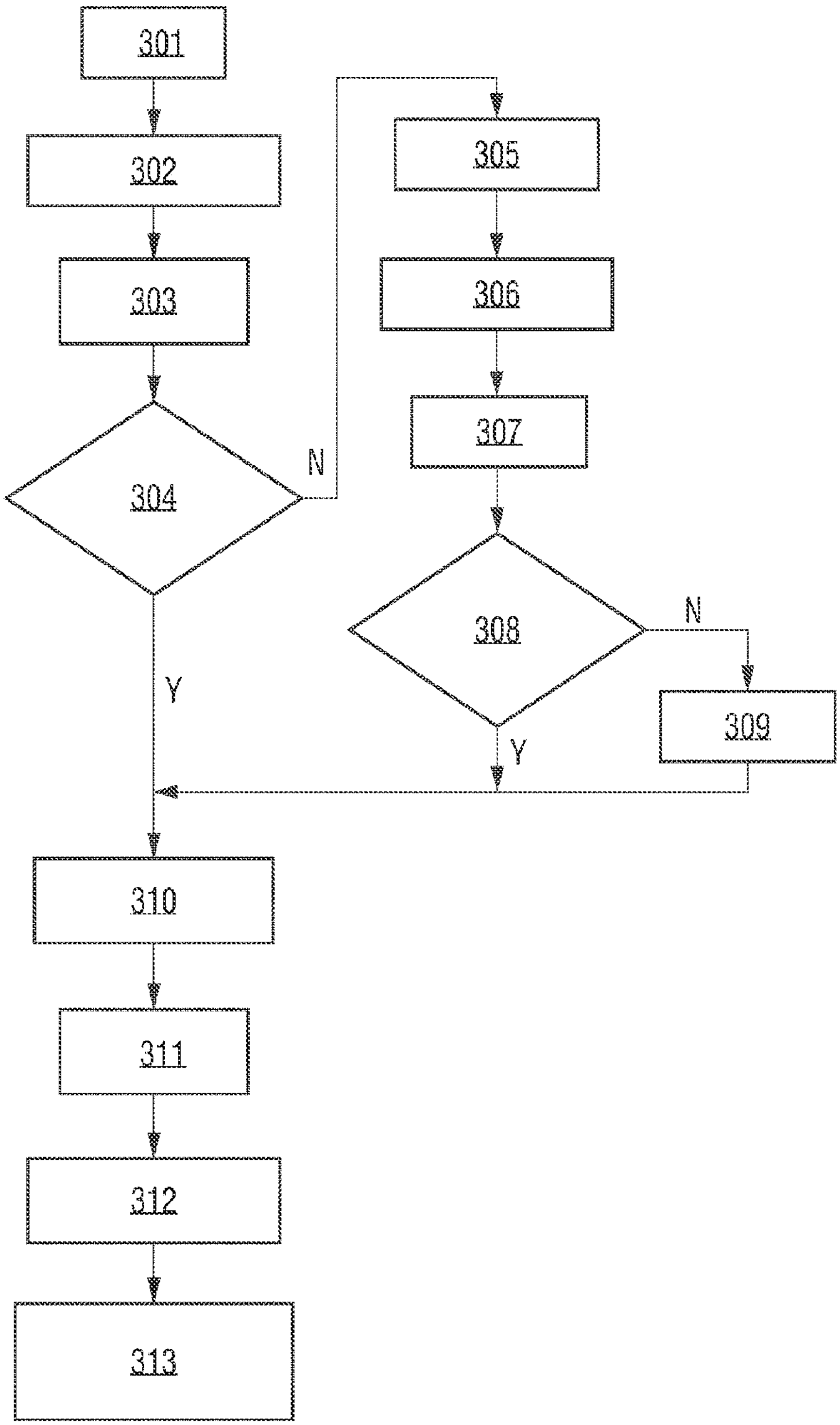
FIG. 3 is a flow diagram illustrating method for fault diagnosis and solution recommendation based on the application scenario shown in FIG. 2 incorporating teachings of the present disclosure.

FIG. 3 is a flow diagram illustrating method for fault diagnosis and solution recommendation based on the application scenario shown in FIG. 2 incorporating teachings of the present disclosure. As shown in FIG. 3, the method may include the following processes.

At block 301, a user calls the robot, namely the robot receives a fault report.

At block 302, data stream is collected from the machines and corresponding task document from the task management database is obtained.

At block 303, the data stream and the task document are provided to the data stream analysis package, and the data stream analysis package analyzes the data steam based on a comparison between the data stream and the task document.

At block 304, it is determined that whether correct problem description information is obtained. When the correct problem description information is obtained, block 310 is performed; otherwise, block 305 is performed.

At block 305, the user is instructed to take a photo of the problem.

At block 306, the photo uploaded by the user is received.

At block 307, the photo is provided to the multimedia content analysis package, and the multimedia content analysis package analyzes the photo.

At block 308, obtained problem description information is fed back to the user, and it is determined by the user whether correct problem description information is obtained. When the correct problem description information is obtained, block 310 is performed; otherwise, block 309 is performed.

At block 309, amended or newly written problem description information by the user is received, and the amended or newly written problem description information is taken as correct problem description information.

At block 310, the problem description information is provided to the diagnosis package generated based on convolutional neural network.

At block 311, the diagnosis package analyzes the problem description information and generates a diagnosis report.

At block 312, the diagnosis report is provided to the recommendation engine, and the recommendation engine recommends a corresponding solution based on a knowledge graph.

At block 313, the image database is updated based on a feedback about the problem description information from the user and a fault analysis model is updated based on updated image database.

Figure 4:
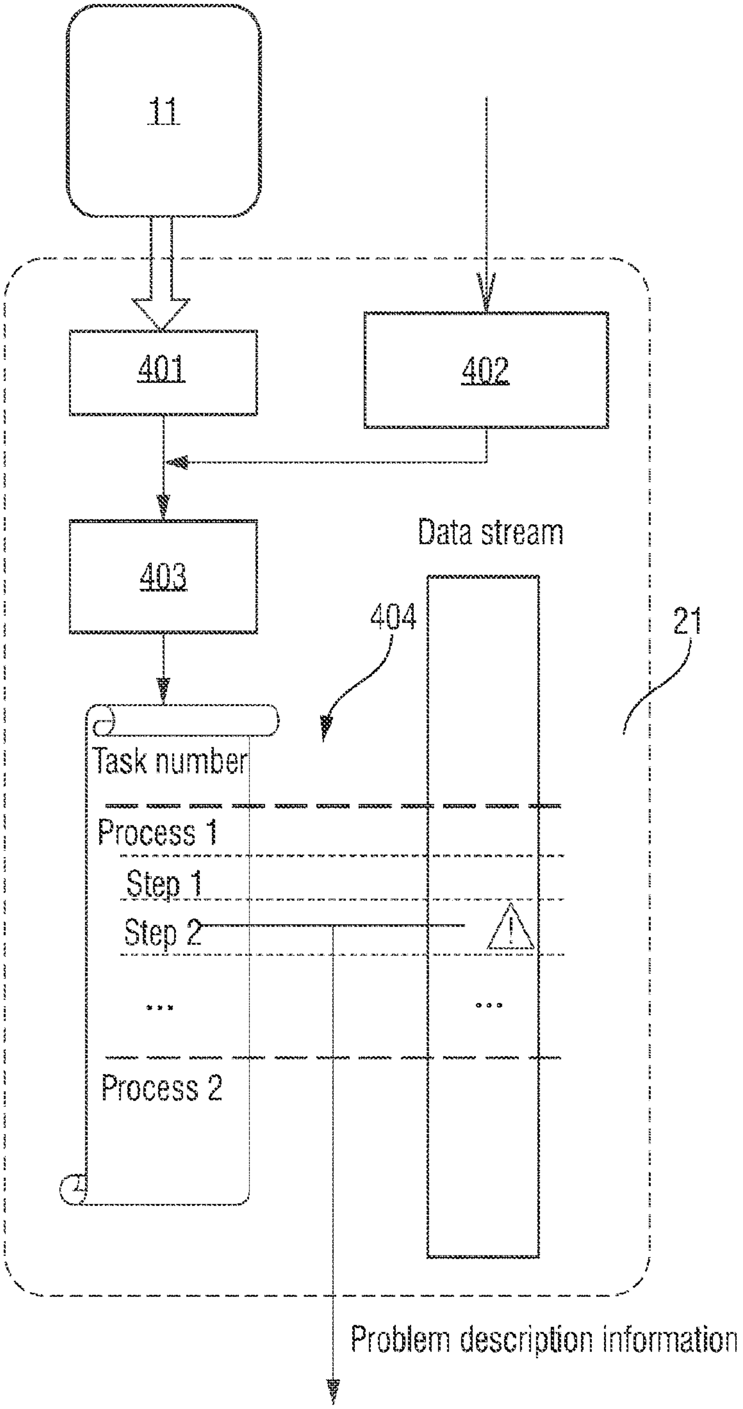
FIG. 4 is a schematic diagram illustrating the working principle of the data stream analysis package in the application scenario shown in FIG. 2 incorporating teachings of the present disclosure.

FIG. 4 is a schematic diagram illustrating the working principle of the data stream analysis package 21 in the application scenario shown in FIG. 2 incorporating teachings of the present disclosure. As shown in FIG. 4, the working principle may include the following processes.

At block 401, a task list is obtained from the task management database 11.

At block 402, a machine number and a timestamp are obtained based on the OPC UA.

At block 403, a task document is obtained according to the task list, the machine number and the timestamp.

At block 404, data stream obtained based on the OPC UA is divided into multiple data segments according to the processes and steps in each process in the task document, and the target step with a fault is determined by location an error signal in a data segment, and then the part corresponding to the target step in the task document is compared with that in the data stream and the fault reason is analyzed based on the comparison, and the problem description information is generated.

Figure 5:
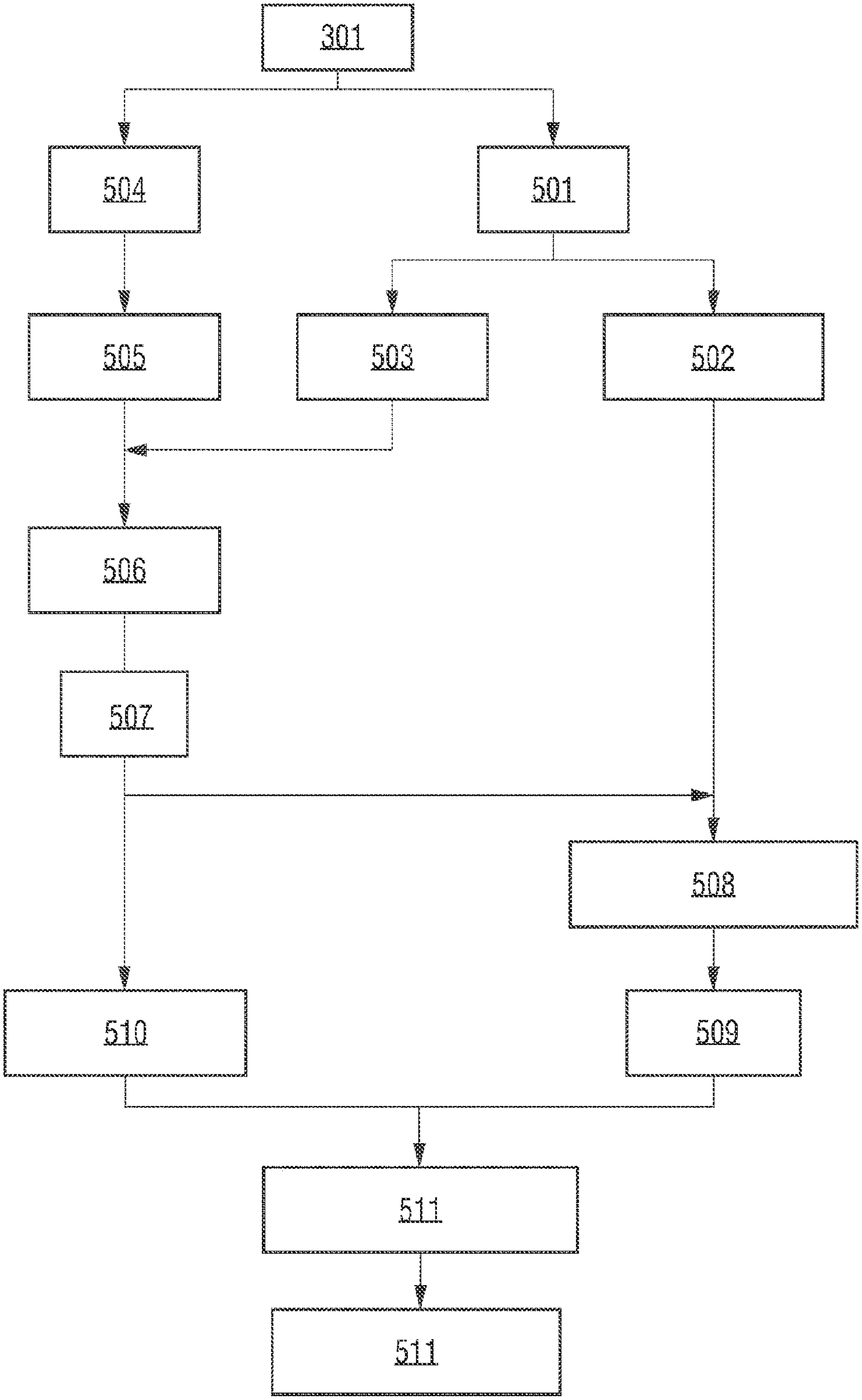
FIG. 5 is a flow diagram illustrating a data stream analysis method performed by the data stream analysis package shown in FIG. 4.

FIG. 5 is a flow diagram illustrating a data stream analysis method performed by the data stream analysis package shown in FIG. 4. As shown in FIG. 5, the method may include the following processes.

At block 501, in response to receiving a fault report in block 301, a first data is received from machines.

At block 502, data stream in the first data is recorded.

At block 503, a machine number and timestamps are read from the first data.

At block 504, in response to receiving a fault report in block 301, a second data is read from the task management database.

At block 505, a list of tasks (also called task list) is read from the second data.

At block 506, according to the machine number and timestamps, a corresponding task is found.

At block 507, a task document corresponding to the task is read.

At block 508, the data stream is divided into multiple data segments based on the processes and steps in each process in the task document.

At block 509, a section or a target step with an error signal is determined and extracted.

At block 510, the corresponding part in the task document is extracted.

At block 511, the extracted section is compared with the extracted corresponding part, and is analyzed based on the comparison.

At block 512, problem description information is generated.

Figure 6:
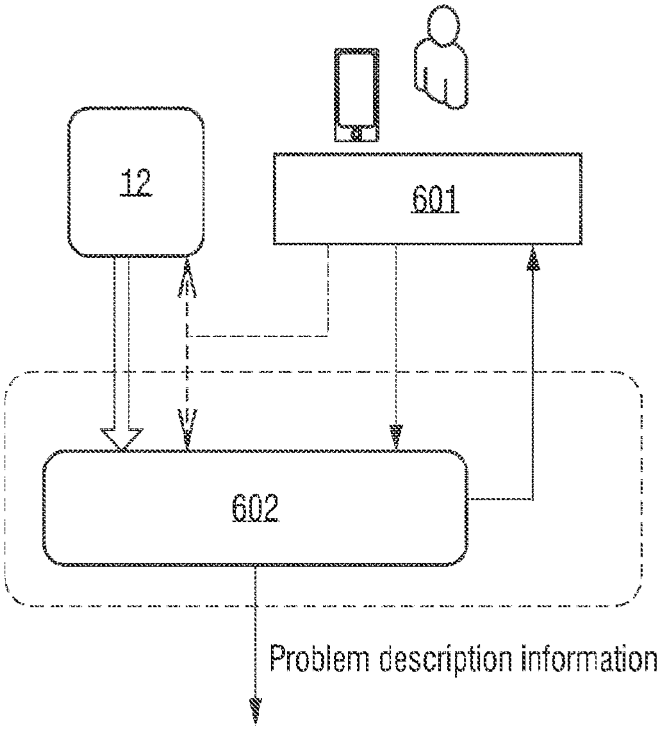
FIG. 6 is a schematic diagram illustrating the working principle of the multimedia content analysis package in the application scenario shown in FIG. 2 incorporating teachings of the present disclosure.

FIG. 6 is a schematic diagram illustrating the working principle of the multimedia content analysis package 22 in the application scenario shown in FIG. 2 incorporating teachings of the present disclosure. As shown in FIG. 6, the working principle may include the following processes.

At block 601, a user takes a photo utilizing an App in mobile, and uploads the photo.

At block 602, the photo is input into a fault analysis model which is trained based on a large number of historical fault multimedia content and problem description information pair stored in the image database 12. The fault analysis model performs classification on the photo and output corresponding problem description information. The problem description information is fed back to the user, and correct problem description information confirmed by the user is received. The image database 12 may be updated according to the feedback of the user, and then the fault analysis model may be updated based on updated image database 12.

Figure 7:
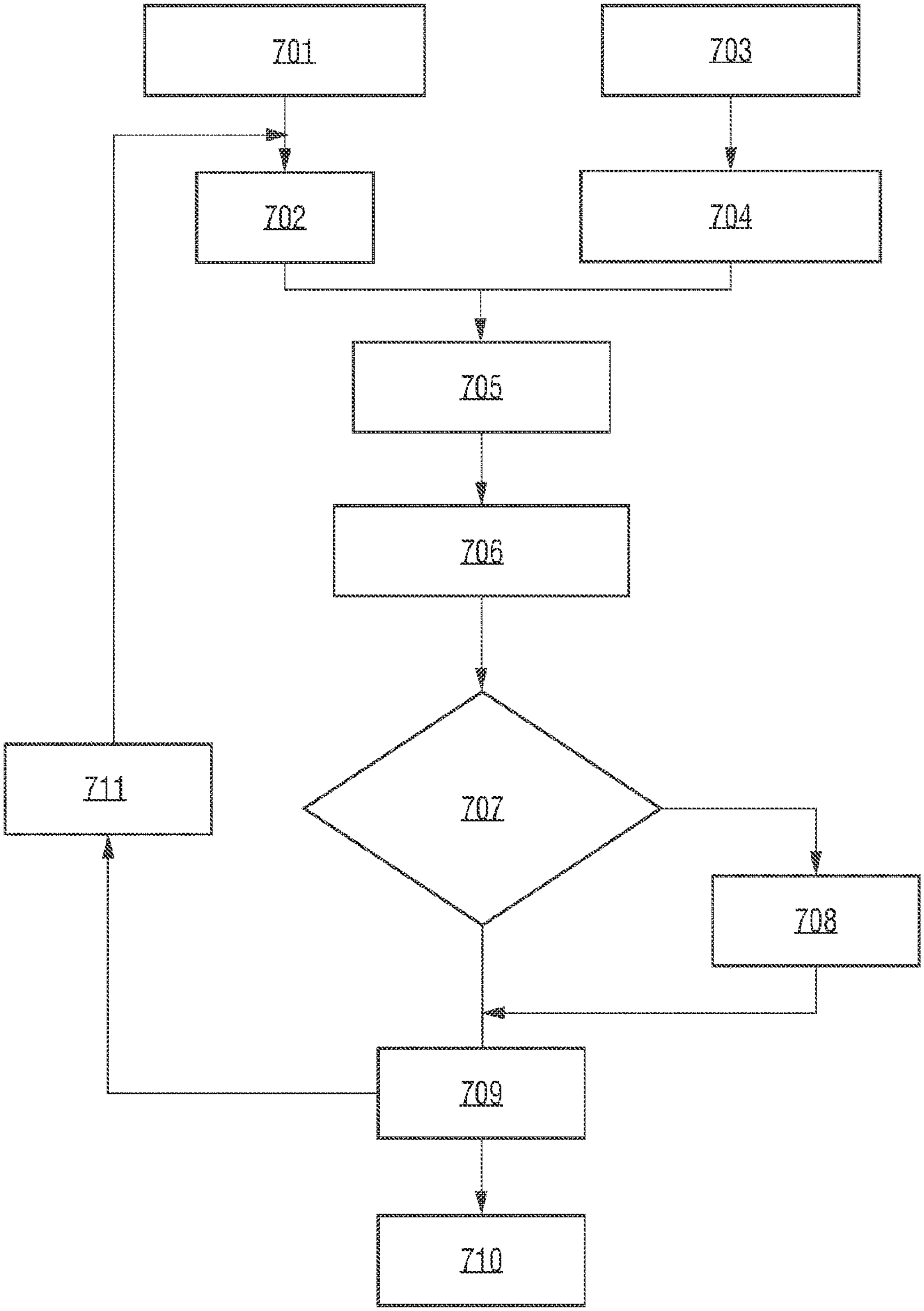
FIG. 7 is a flow diagram illustrating a multimedia content analysis method performed by the multimedia content analysis package shown in FIG. 6.

FIG. 7 is a flow diagram illustrating a multimedia content analysis method performed by the multimedia content analysis package shown in FIG. 6. As shown in FIG. 7, the method may include the following processes:

At block 701, the historical fault multimedia content and problem description information pair stored in the image database 12 is analyzed.

At block 702, a fault analysis model is built based on convolutional neural network, and is trained utilizing the historical fault multimedia content and problem description information pair stored in the image database 12.

At block 703, a photo is taken and uploaded.

At block 704, in response to receiving a photo, the photo is input into the fault analysis model.

At block 705, the fault analysis model classifies the photo and generates corresponding problem description information.

At block 706, the problem description information is displayed on a screen of the robot and waiting for confirmation of the user.

At block 707, it is determined that whether correct problem description information is obtained, when the correct problem description information is obtained, block 709 is performed; otherwise, block 708 is performed.

At block 708, amended or newly written problem description information by the user is received, and the amended or newly written problem description information is taken as correct problem description information.

At block 709, a new record item consisting of the correct problem description information and the fault multimedia content pair is generated.

At block 710, the correct problem description information is provided to the diagnosis package.

At block 711, the new record item is added into the image database, and then the fault analysis model may be updated based on updated image database.

Figure 8:
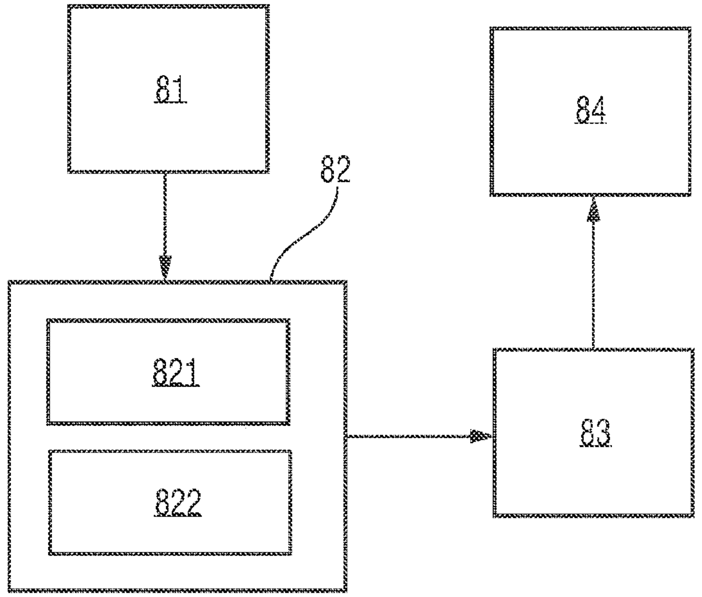
FIG. 8 is a schematic diagram illustrating a device for fault diagnosis and solution recommendation incorporating teachings of the present disclosure.

FIG. 8 is a schematic diagram illustrating a device for fault diagnosis and solution recommendation incorporating teachings of the present disclosure. The device may be used to perform the method shown in FIGS. 1 to 7. For the contents not disclosed in detail in the device examples of the disclosure, please refer to the corresponding description examples of the disclosure, and will not be repeated hereinafter. As shown in FIG. 8, the device may include a data obtaining module 81, a fault analysis module 82, a fault diagnosis module 83 and a solution recommendation module 84.

The data obtaining module 81 is configured to obtain original data including fault problem of a target device. The original data may include the data stream with a device identification and time information, and/or fault multimedia content. The fault multimedia content may include: a video containing fault process or a photo containing fault area.

The fault analysis module 82 is configured to analyze the original data including fault problem to obtain problem description information.

When the original data includes the data stream with device identification and time information, the fault analysis module 82 may include a data stream analysis module 821, and the data stream analysis module 821 is configured to find a corresponding task document from a task management database according to the device identification and time information of the target device; according to the standard processes and steps in the task document, to divide the data stream collected from the target device into corresponding data segments, to determine a target step with a fault by locating an error signal in a data segment, to compare the part corresponding to the target step in the task document with that in the data stream and analyze the fault reason based on the comparison, and to generate the problem description information.

When the original data includes the multimedia content, the fault analysis module 82 may include a multimedia content analysis module 822, and the multimedia content analysis module 822 is configured to input the fault multimedia content into a fault analysis model trained in advance based on convolutional neural network, and to obtain the problem description information output by the fault analysis model.

Furthermore, the multimedia content analysis module 822 feeds back the problem description information to the user for checking, and receives problem description information confirmed by the user. Then, the multimedia content analysis module 822 takes the problem description information confirmed by the user as the finally determined problem description information.

The fault diagnosis module 83 is configured to analyze the problem description information to obtain a diagnosis report. The fault diagnosis module 803 may input the problem description information into a pre-trained fault diagnosis model based on convolutional neural network, and obtain a diagnosis report output by the fault diagnosis model.

The solution recommendation module 84 is configured to obtain obtaining a video and/or document solution for the fault based on a knowledge map according to the diagnosis report, and to recommend the video and/or document solution to a user. The knowledge map comprises: nodes representing the fault, video solution and/or document solution, and multiple edges representing the relationship between nodes.

In fact, the device for fault diagnosis and solution recommendation provided by this implementation manner of the present disclosure may be specifically implemented in various manners. For example, the device for fault diagnosis and solution recommendation may be compiled, by using an application programming interface that complies with a certain regulation, as a plug-in that is installed in an intelligent terminal, or may be encapsulated into an application program for a user to download and use.

When compiled as a plug-in, the device for fault diagnosis and solution recommendation may be implemented in various plug-in forms such as ocx, dll, and cab. The device for fault diagnosis and solution recommendation provided by this implementation manner of the present disclosure may also be implemented by using a specific technology, such as a Flash plug-in technology, a RealPlayer plug-in technology, an MMS plug-in technology, a MIDI staff plug-in technology, or an ActiveX plug-in technology.

The method for fault diagnosis and solution recommendation provided by this implementation manner of the present disclosure may be stored in various storage mediums in an instruction storage manner or an instruction set storage manner. These storage mediums include, but are not limited to: a floppy disk, an optical disc, a DVD, a hard disk, a flash memory, a USB flash drive, a CF card, an SD card, an MMC card, an SM card, a memory stick, and an xD card.

In some embodiments, the method for fault diagnosis and solution recommendation provided by this implementation manner of the present disclosure may also be applied to a storage medium based on a flash memory (Nand flash), such as USB flash drive, a CF card, an SD card, an SDHC card, an MMC card, an SM card, a memory stick, and an xD card. Moreover, it should be clear that an operating system operated in a computer can be made, not only by executing program code read by the computer from a storage medium, but also by using an instruction based on the program code, to implement some or all actual operations, so as to implement functions any the of embodiment in foregoing embodiments.

Figure 9:
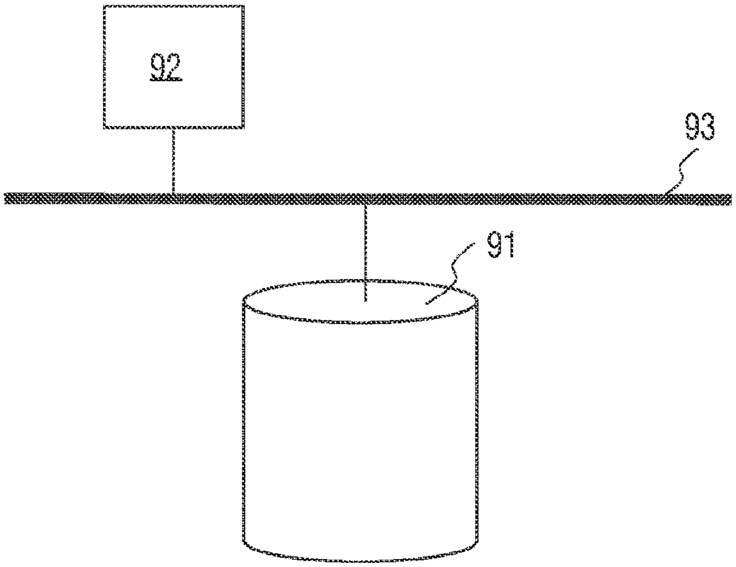
FIG. 9 is a schematic diagram illustrating another device for fault diagnosis and solution recommendation incorporating teachings of the present disclosure.

For example, FIG. 9 is a schematic diagram illustrating another device for fault diagnosis and solution recommendation incorporating teachings of the present disclosure. The device may be used to perform the method shown in FIGS. 1-7, or to implement the device in FIG. 8. As shown in FIG. 9, the device may include at least one memory 91 and at least one processor 92. In addition, some other components may be included, such as communication port, input/output controller, network communication interface, etc. These components communicate through bus 93, etc.

At least one memory 91 is configured to store a computer program 911. In one example, the computer program can be understood to include various modules of the device shown in FIG. 8. In addition, at least one memory 91 may store an operating system or the like. Operating systems include but are not limited to: Android operating system, Symbian operating system, windows operating system, Linux operating system, etc.

At least one processor 92 is configured to call the computer program stored in at least one memory 91 to perform a method for fault diagnosis and solution recommendation described in examples of the present disclosure. The processor 92 can be CPU, processing unit/module, ASIC, logic module or programmable gate array, etc. It can receive and send data through the communication port.

The I/O controller has a display and an input device, which is used to input, output and display relevant data.

Some embodiments include a system for fault diagnosis and solution recommendation. The system may include the device shown in FIG. 8 or FIG. 9, the task management database 11, the image database 12 and the instructional resources knowledge map 13 shown in FIG. 2.

In the present disclosure, because all of the fault analysis, fault diagnosis and solution recommendation are performed by the third party, the user only needs to do some simple operations without analyzing the fault reason, thus the intelligent fault diagnosis and solution recommendation is achieved, and the flexibility and efficiency of fault diagnosis and solution recommendation is improved.

It should be understood that, as used herein, unless the context clearly supports exceptions, the singular forms "a"

("a", "an", "the") are intended to include the plural forms. It should also be understood that, "and/or" used herein is intended to include any and all possible combinations of one or more of the associated listed items.

The example embodiments of the present disclosure are only used for description, and do not represent the merits of the implementations. The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and examples various with various modifications as are suited to the particular use contemplated.

What is claimed is:

1. A method for fault diagnosis and solution recommendation, the method comprising:

obtaining original data including fault problem of a target device, wherein the original data includes an error signal generated by the target device, and the original data comprises a data stream with device identification and time information;

analyzing the original data to obtain problem description information including obtaining a task document from a cloud task management database according to the device identification and time information, wherein the cloud task management database stores task documents comprising the standard processes and steps of each task of each device;

analyzing the problem description information to obtain a diagnosis report, comprising:

dividing the data stream into corresponding data segments according to the standard processes and steps in the task document;

determining a target step with a fault by locating an error signal in a data segment; and comparing the part corresponding to the target step in the task document with that in the data stream, analyzing a fault reason based on the comparison, and generating the problem description information; and according to the diagnosis report, obtaining a video and/or document solution for the fault based on a cloud knowledge map, and recommending the solution to a user;

wherein the knowledge map comprises: nodes representing the fault, video solution and/or document solution, and multiple edges representing the relationship between nodes.

2. The method according to claim 1, wherein:

obtaining original data including fault problem of a target device comprises collecting data stream with device identification and time information at a set frequency; and in response to receiving a fault report from a user, extracted corresponding data stream of the target device from the obtained data stream according to the device identification and time information provided by the fault report.

3. The method according to claim 1, wherein:

analyzing the problem description information to obtain a diagnosis report comprises inputting the problem description information into a pre trained fault diagnosis model based on convolutional neural network, and obtaining a diagnosis report output by the fault diagnosis model;

the fault diagnosis model is trained by taking a large number of historical problem description information as the input samples, and taking the historical diagnosis report corresponding to each piece of historical problem description information as the output samples.

4. The method according to claim 1, wherein:

original data including fault problem comprises: fault multimedia content, and the fault multimedia content comprises: a video containing fault process or a photo containing fault area;

analyzing the original data including fault problem to obtain problem description information comprises inputting the fault multimedia content into a fault analysis model trained in advance based on convolutional neural network, and obtaining the problem description information output by the fault analysis model;

the fault analysis model is trained by taking a large number of historical fault multimedia content as input samples, and taking corresponding historical problem description information of fault multimedia content as output samples; and the historical fault multimedia content and corresponding historical problem description information are stored in a cloud image database.

5. The method according to claim 4, wherein:

the fault analysis model comprises a multimedia content classification model and multiple fault analysis sub models;

the multimedia content classification model is to classify the multimedia content, and input the multimedia content to a corresponding fault analysis sub model according to a classification result; and each fault analysis sub model is to output corresponding problem description information according to the input multimedia content.

6. The method according to claim 4, further comprising:

feeding back the problem description information to the user for checking, and receiving problem description information confirmed by the user;

taking the problem description information confirmed by the user as finally determined problem description information; and storing the finally determined problem description information and the fault multimedia content in the cloud image database as a new historical sample to optimize the fault analysis model.

7. A device for fault diagnosis and solution recommendation, the device comprising:

a data obtaining module, to obtain original data including fault problem of a target device, wherein the original data includes an error signal generated by the target device, the original data comprising a data stream with device identification and time information;

a fault analysis module, to analyze the original data to obtain problem description information including obtaining a task document from a cloud task management database according to the device identification and time information, wherein the cloud task management database stores task documents comprising the standard processes and steps of each task of each device;

a fault diagnosis module, to analyze the problem description information to obtain a diagnosis report, comprising:

dividing the data stream into corresponding data segments according to the standard processes and steps in the task document;

determining a target step with a fault by locating an error signal in a data segment; and comparing the part corresponding to the target step in the task document with that in the data stream, analyzing a fault reason based on the comparison, and generating the problem description information; and a solution recommendation module, to obtain obtaining a video and/or document solution for the fault based on a cloud knowledge map according to the diagnosis report, and to recommend the video and/or document solution to a user, wherein the original data comprises data stream with a device identification and time information, and/or fault multimedia content, and the fault multimedia content comprises: a video containing fault process or a photo containing fault area, and wherein the fault analysis module comprises a data stream analysis module and/or a multimedia content analysis module;

the data stream analysis module is further programmed to obtain a task document from a cloud task management database according to the device identification and time information;

the cloud task management database stores task documents comprising the standard processes and steps of each task of each device, and divide the data stream into corresponding data segments according to the standard processes and steps in the task document.

8. The device according to claim 7, wherein:

determine a target step with a fault by locating an error signal in a data segment; and compare the part corresponding to the target step in the task document with that in the data stream, analyze a fault reason based on the comparison, and generate the problem description information;

the multimedia content analysis module is further programmed to input the fault multimedia content into a fault analysis model trained in advance based on convolutional neural network, and obtain the problem description information output by the fault analysis model;

the fault analysis model is trained by taking a large number of historical fault multimedia content as input samples, and taking corresponding historical problem description information of fault multimedia content as output samples; and the historical fault multimedia content and corresponding historical problem description information are stored in an cloud image database.

9. A system for fault diagnosis and solution recommendation, the system comprising:

a device comprising: a data obtaining module, to obtain original data including fault problem of a target device, a fault analysis module, to analyze the original data to obtain problem description information including obtaining a task document from a cloud task management database according to the device identification and time information, a fault diagnosis module, to analyze the problem description information to obtain a diagnosis report, the diagnosis report comprising:

dividing the data stream into corresponding data segments according to the standard processes and steps in the task document;

determining a target step with a fault by locating an error signal in a data segment; and comparing the part corresponding to the target step in the task document with that in the data stream, analyzing a fault reason based on the comparison, and generating the problem description information and a solution recommendation module, to obtain obtaining a video and/or document solution for the fault based on a cloud knowledge map according to the diagnosis report, and to recommend the video and/or document solution to a user;

wherein the original data includes an error signal generated by the target device, the original data comprising a data stream with device identification and time information;

wherein the cloud task management database stores task documents comprising the standard processes and steps of each task of each device;

a cloud image database storing historical fault multimedia content and corresponding historical problem description information of fault multimedia content; and a cloud instructional resources knowledge map showing nodes representing a fault, a video solution and/or document solution, and multiple edges representing the relationship between nodes.

* * * * *